US007617771B2

(12) United States Patent
Ogawa

(10) Patent No.: US 7,617,771 B2

(45) **Date of Patent: *Nov. 17, 2009**

(54) PRINTING RUBBER BLANKET

(75) Inventor: Yoshiharu Ogawa, Ibaraki (JP)

(73) Assignee: Kinyosha Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/202,706

(22) Filed: Aug. 12, 2005

(65) Prior Publication Data

US 2005/0274270 A1 Dec. 15, 2005

Related U.S. Application Data

(63) Continuation of application No. PCT/JP03/09760, filed on Jul. 31, 2003.

(30) Foreign Application Priority Data

Feb. 27, 2003 (JP) ........................ PCT/JP03/02235

(51) Int. Cl.
*B32B 7/02* (2006.01)

(52) U.S. Cl. ........................ 101/376; 428/216; 428/214; 428/909

(58) Field of Classification Search ................. 101/376, 101/216
See application file for complete search history.

(56) References Cited

U.S. PATENT DOCUMENTS 4,042,743 A * 8/1977 Larson et al. ............... 442/224
5,006,447 A * 4/1991 Umeda et al. ............ 430/272.1
5,478,637 A * 12/1995 Tomono et al. ............. 442/250
5,549,968 A * 8/1996 Byers et al. .................... 442/70
5,832,824 A * 11/1998 Okubo et al. ............... 101/217
6,244,178 B1 * 6/2001 DeMoore et al. ......... 101/401.1
6,382,102 B1 * 5/2002 Herrmann et al. ........... 101/376
6,782,820 B1 * 8/2004 Okubo et al. ............... 101/375
6,899,029 B2 * 5/2005 Invernizzi ................... 101/376
2001/0032560 A1 * 10/2001 Andrew et al. .............. 101/376

(Continued)

FOREIGN PATENT DOCUMENTS

EP 0 995 185 A1 11/1999

(Continued)

OTHER PUBLICATIONS

International Search Report issued by the International Searching Authority issued Sep. 2, 2003 in connection with related International Application No. PCT/JP03/02235.

*Primary Examiner*—Judy Nguyen
*Assistant Examiner*—Joshua D. Zimmerman
(74) *Attorney, Agent, or Firm*—John P. White; Cooper & Dunham LLP

(57) ABSTRACT

A printing rubber blanket includes a surface rubber layer, a second base fabric layer and a first base fabric layer to be provided between the surface rubber layer and second base fabric layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction, and a breaking strength within a range of 20 to 70 kgf/cm in the printing direction.

13 Claims, 2 Drawing Sheets

U.S. PATENT DOCUMENTS

| | | | | |
|---|---|---|---|---|
| 2003/0010238 | A1 | 1/2003 | Rodgers | |
| 2003/0066449 | A1 * | 4/2003 | Iwasaki | 101/376 |
| 2004/0001935 | A1 * | 1/2004 | Ogawa et al. | 428/98 |

FOREIGN PATENT DOCUMENTS

| | | | |
|---|---|---|---|
| EP | 1 195 263 | A1 | 4/2002 |
| JP | 07-081267 | | 3/1995 |
| WO | WO 03/059641 | A1 | 7/2003 |

* cited by examiner

PRINTING RUBBER BLANKET

CROSS-REFERENCE TO RELATED APPLICATIONS

This is a Continuation Application of PCT Application No. PCT/JP03/09760, filed Jul. 31, 2003, which was published under PCT Article 21(2) in Japanese.

This application is based upon and claims the benefit of priority from prior No. PCT/JP03/02235, filed Feb. 27, 2003, the entire contents of which are incorporated herein by reference.

BACKGROUND OF THE INVENTION

1. Field of the Invention

The present invention relates to a printing rubber blanket used in an offset printing press or the like.

2. Description of the Related Art

As a printing rubber blanket, one having a surface rubber layer with a smooth surface and a reinforcing layer which is bonded to the surface rubber layer and formed of two to four woven fabrics is known. The printing blanket is used as it is wound around a cylinder.

For example, in printing that uses a lithographic printing rubber blanket, printing ink is applied to a roll-like plate cylinder on which characters and images are formed. The characters and images are transferred onto the smooth rubber surface of the surface layer of a rubber blanket that rotates in tight contact with the plate cylinder. Then, the same characters and images as those on the rubber blanket are transferred onto a sheet surface to obtain a printed product. In printing that uses the rubber blanket, if expansion and shrinkage, i.e., a "shift", occur on the surface of the rubber blanket, the characters and images on the plate cylinder are not transferred onto the printing sheet correctly.

Jpn. Pat. Appln. KOKAI Publication No.. 7-81267 has the following description. In a printing blanket formed of a support layer including a plurality of woven fabrics, and a surface layer, of the woven fabrics that form the support layer, at least one which is close to the surface layer is formed of a woven fabric in which the warp which is to extend in the rotational direction of a blanket cylinder is formed from polyester mixed yarns. The residual elongation in the warp direction of the woven fabric is set to 20% or more. Then, durability against repeated compression in high-speed printing is increased.

In the printing blanket described in the above reference, when printing pressure is applied, a large shift occurs. Particularly, in printing with a high-speed newspaper press, as the "shift" occurs, the paper feeding ratio (increasing circumference ratio) of the rubber blanket increases, leading to problems such as travel instability of the printing sheet.

According to Jpn. Pat. Appln. KOKAI Publication No. 2000-343852, paragraph [0009], PVA-based fiber is used. In the PVA-based fiber, first recessed and projecting ridges are formed on the fiber surface along the axial direction of the fiber, and second recessed and projecting fine ridges are formed in the first recessed and projecting ridges. This suppresses a shift between fibers, and the dimensional stability of the base fabric is increased.

When recesses and projections are formed in the PVA-based fiber as in Jpn. Pat. Appln. KOKAI Publication No. 2000-343852, the paper feeding ratio (increasing circumference ratio) accompanying a "shift" in printing with the high-speed rotary printing press cannot be controlled to be small. Thus, problems such as travel instability of the sheet are caused.

BRIEF SUMMARY OF THE INVENTION

It is an object of the present invention to provide a printing rubber blanket which has a small paper feeding ratio during printing and excellent durability.

According to a first aspect of the present invention, there is provided a printing rubber blanket comprising:

a surface rubber layer;

a first base fabric layer to be adhered to a lower surface of the surface rubber layer;

a compression layer to be adhered to the first base fabric layer; and a second base fabric layer to be adhered to the compression layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction, and a breaking strength within a range of 20 to 70 kgf/cm in the printing direction.

According to a second aspect of the present invention, there is provided a printing rubber blanket comprising:

a surface rubber layer;

a second base fabric layer; and a first base fabric layer to be provided between the surface rubber layer and second base fabric layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction, and a breaking strength within a range of 20 to 70 kgf/cm in the printing direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present inventors have made extensive studies and reached the following findings. When the thickness of the first base fabric layer containing at least one type of fiber selected from the group consisting of nylon-based fiber, polyester-based fiber, polyvinyl-alcohol-based fiber, polyolefin-based fiber, rayon fiber, and cotton fiber is 0.17 to 0.33 mm, and its breaking strength in the printing direction is 20 to 70 kgf/cm, a correlation exists between the residual elongation of the first base fabric layer of the rubber blanket and the paper feeding ratio of the rubber blanket during printing. If the residual elongation is 7% (inclusive) to 15% (exclusive), the shift of the first base fabric layer during printing can be suppressed. Consequently, the travel stability of the printing sheet in high-speed printing can be increased, and simultaneously the durability can be improved.

An example of a printing rubber blanket according to the present invention will be described with reference to FIGS. 1 and 2.

Figure 1:
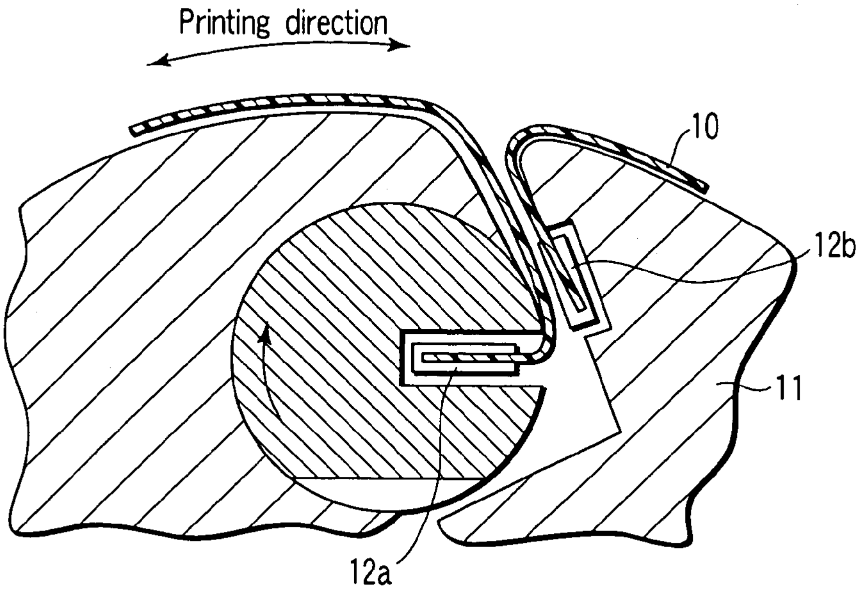
FIG. 1 is a schematic view showing a state wherein an embodiment of a printing rubber blanket according to the present invention is mounted on a cylinder.
Figure 2:
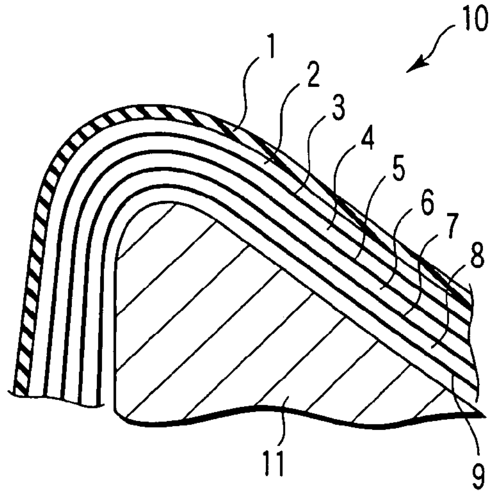
FIG. 2 is an enlarged sectional view of the main part of the printing rubber blanket of FIG. 1.

A printing rubber blanket shown in FIGS. 1 and 2 is substantially formed of a band-like multilayered material including a surface rubber layer 1, a first base fabric layer 3, an adhesive layer 2 adhered to the lower surface of the surface rubber layer 1 and the upper surface of the first base fabric layer 3, a compression layer 4 adhered to the first base fabric layer 3, a second base fabric layer 5 adhered to the compression layer 4, an adhesive layer 6 adhered to the second base fabric layer 5, a third base fabric layer 7 adhered to the adhesive layer 6, an adhesive layer 8 adhered to the third base fabric layer 7, and a fourth base fabric layer 9 adhered to the adhesive layer 8. This printing rubber blanket 10 has one end fixed to a bar portion 12*a* of a cylinder 11 and the other end fixed to a bar portion 12*b* of the cylinder 11. Thus, the rubber blanket 10 is wound around the cylinder 11 with a tension being applied to it.

FIG. 2 partially enlarges the wound corner portion of the rubber blanket of FIG. 1. As the rubber blanket is largely bent at an acute angle at the corner portion of the cylinder, a woven fabric layer closer to the surface of the rubber blanket has a higher tension. In particular, the first base fabric layer adhered to the lower surface of the surface rubber layer is highly likely to be in danger of being broken by a dynamic impact applied to it during use. Hence, it is desirable to increase the residual elongation of the first base fabric layer than that of a base fabric layer (in this case, second to fourth base fabric layers) located inside the first base fabric layer.

The first base fabric layer will be described in detail.

A practical example of nylon-based fiber can include 6,6-nylon, 6-nylon, and the like.

A practical example of polyester-based fiber can include polyester, polyethylene terephthalate, and the like.

A practical example of polyolefin-based fiber can include polyethylene, polypropylene, and the like.

A practical example of rayon fiber can include polynosic fiber and the like.

A practical example of polyvinyl-alcohol-based fiber can include vinylon manufactured by Kuraray Co., Ltd, K2 vinylon manufactured by Kuraray Co., Ltd, and the like.

Above all, a first base fabric layer containing at least one type of fiber selected from the group consisting of cotton fiber, nylon-based fiber, polyvinyl-alcohol-based fiber, and polyester-based fiber is preferable because it can increase the durability of the rubber blanket.

The reason why the thickness of the first base fabric layer is limited within the above range will be described. If the thickness is less than 0.17 mm, the durability against dynamic stress that acts on the rubber blanket due to repeated high-speed printing is insufficient. If the thickness exceeds 0.33 mm, cloth marks tend to appear on the printed surface. The further preferable range of the thickness is 0.17 to 0.25 mm.

The reason why the breaking strength of the first base fabric layer in the printing direction is limited within the above range will be described. The rubber blanket is mounted on the cylinder as it is largely bent at an acute angle as shown in FIG. 1 described above. If the breaking strength is less than 20 kgf/cm, the rubber blanket can be broken easily at its bent portion. If the breaking strength exceeds 70 kgf/cm, the base fabric becomes rigid (the rigidity increases), and accordingly the blanket cannot be mounted well. The further preferable range of the breaking strength is 30 to 70 kgf/cm.

The reason why the residual elongation of the first base fabric layer in the printing direction is limited within the above range will be described. If the residual elongation is less than 7%, that portion of the rubber blanket which abuts against the corner portion of the cylinder tends to be broken easily. If the residual elongation is 15% or more, the paper feeding ratio of the rubber blanket during printing increases. The further preferable range of the residual elongation is 7% to 11%.

The surface rubber layer, compression layer, and second base fabric layer will be described.

1) Surface Rubber Layer

The surface rubber layer controls reception of the ink.

As the surface rubber layer, for example, one obtained by vulcanizing a rubber compound sheet can be used. As the rubber material contained in the rubber compound, for example, nitrile rubber can be enumerated.

The thickness of the surface rubber layer is desirably within the range of 0.15 to 0.45 mm. This is due to the following reason. If the thickness of the surface rubber layer is less than 0.15 mm, recesses and projections corresponding to the cloth marks of the first base fabric layer tend to be formed on the surface of the surface rubber layer easily. Then, the cloth marks of the first base fabric layer may be reproduced on the printed product, rendering the printed product defective. If the thickness of the surface rubber layer exceeds 0.45 mm, the deformation and distortion of surface rubber of the blanket may be increased by the pressure applied during printing. Then, the paper feeding ratio may increase. The further preferable range of the thickness of 0.2 to 0.35 mm.

2) Compression Layer

The compression layer desirably contains a porous oil-resistant rubber matrix as a major component. An oil-resistant rubber matrix is obtained by vulcanization. When printing is to be performed with ink that uses a non-polar solvent, as the rubber material, for example, a polar polymer such as acrylonitrile-butadiene rubber (NBR), chloroprene rubber (CR), fluororubber (FKM), or polyurethane rubber (UR) can be used. When printing is to be performed with ink that uses a polar solvent, as the rubber material, for example, a non-polar polymer such as ethylene propylene rubber (EPDM) or butyl rubber (IIR) can be used. The rubber compound desirably contains, in addition to the rubber material, an additive which makes a rubber elastic body. As the additive, for example, a vulcanizing agent, vulcanization accelerator such as D.M (dibenzothiazole, disulfide) or M (2-mercaptobenzothiazole), aging inhibitor, strengthening agent, filler, or plasticizer can be enumerated.

To obtain porous oil-resistant rubber matrix, for example, microcapsules may be added, impregnated paper may be used, or a salt elution method or foaming agent method may be employed.

The thickness of the compression layer is desirably within the range of 0.2 to 0.5 mm. This is due to the following reason. If the thickness of the compression layer is less than 0.2 mm, the compression properties may be impaired. If the thickness of the compression layer exceeds 0.5 mm, tinking down or packing down of the rubber blanket may undesirably increase. The further preferable range of the thickness of the compression layer is 0.25 to 0.45 mm.

3) Second Base Fabric Layer

As the second base fabric layer, for example, woven fabric, unwoven fabric, or the like can be used. As the constituent materials of the respective base fabric layers, ones similar to those described above regarding the first base fabric layer can be enumerated. The first and second base fabric layers may be made of the same type of materials, or of different types of materials.

The breaking strength in the printing direction of the second base fabric layer is desirably within the range of 20 to 70 kgf/cm. This is due to the following reason. If the breaking strength is less than 20 kgf/cm, a sufficient durability may not be obtained against dynamic stress that acts on the rubber blanket repeatedly due to repeated high-speed printing. If the breaking strength exceeds 70 kgf/cm, the base fabric becomes rigid (the rigidity increases), and accordingly the blanket may not be mounted well. The further preferable range of the breaking strength is 30 to 70 kgf/cm.

The residual elongation in the printing direction of the second base fabric layer is desirably within the range of 3% to 7.5%. This is due to the following reason. If the residual elongation is less than 3%, the flexibility of the base fabric decreases, and accordingly the blanket may not be mounted well. If the residual elongation exceeds 7.5%, as the blanket is used over time, it tends to meander on the printing press, causing printing trouble. The further preferable range of the residual elongation is 3.5% to 6.5%.

The residual elongation in the printing direction of the second base fabric layer is desirably equal to or smaller than the residual elongation in the printing direction of the first base fabric layer. Then, a positional shift of the surface rubber layer that occurs when a printing pressure is applied to the rubber blanket can be further decreased. Hence, a change in paper feeding ratio during high-speed printing can be further decreased, and the registration can be further improved.

The thickness of the second base fabric layer is desirably within the range of 0.2 to 0.5 mm. This is due to the following reason. If the thickness is less than 0.2 mm, it is difficult to maintain the strength of the base fabric. If the thickness exceeds 0.5 mm, tinking down or packing down of the base fabric may undesirably increase. The further preferable range of the thickness is 0.25 to 0.45 mm.

4) Third and Fourth Base fabric Layers

The material, thickness, breaking strength, and residual elongation of each of the third to fourth base fabric layers can be the same as those described regarding the second base fabric layer described above. The second to fourth base fabric layers can have the same composition or different compositions.

5) Adhesive Layer

The adhesive layers are used to adhere respective layers that form the printing rubber blanket.

Each adhesive layer contains an oil-resistant rubber matrix as a major component. As the rubber material used in the oil-resistant rubber matrix, the same one as that described regarding the compression layer can be used.

Figure 6:
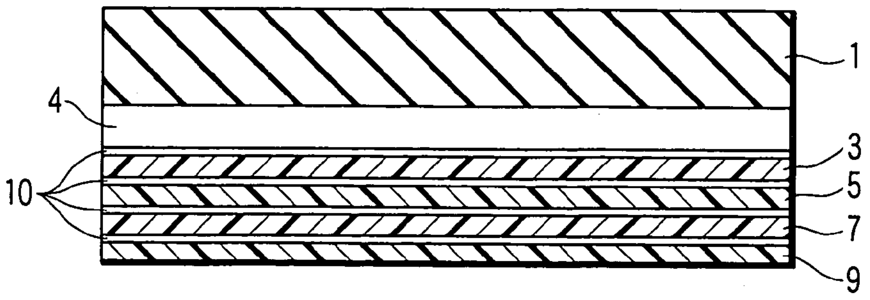
FIG. 6 is a sectional view showing another embodiment of the printing rubber blanket according to the present invention.

In FIG. 1, the first base fabric layer is adhered to the surface rubber layer, but the present invention is not limited to this arrangement. As far as the first base fabric layer is arranged between the surface rubber layer and second base fabric layer, the shift of the surface rubber layer during printing is suppressed without impairing the durability, that is, without breaking the blanket when it is wound around the cylinder, and the travel stability of the printing sheet in high-speed printing can be increased. An example will be described with reference to FIG. 6 in which a first base fabric layer is arranged between a surface rubber layer and second base fabric layer and a compression layer is arranged between the first base fabric layer and surface rubber layer. In FIG. 6, the constituent members equivalent to those described with reference to FIG. 2 will be denoted by the same reference numerals.

A printing rubber blanket exemplified in FIG. 6 has a surface rubber layer 1, a compression layer 4 adhered to the lower surface of the surface rubber layer 1, a first base fabric layer 3 bonded to the compression layer 4 through an adhesive layer 10, a second base fabric layer 5 bonded to the first base fabric layer 3 through an adhesive layer 10, a third base fabric layer bonded to the second base fabric layer 5 through an adhesive layer 10, and a fourth base fabric layer 9 bonded to the third base fabric layer 7 through an adhesive layer 10.

According to the printing rubber blanket with this arrangement, the elongation of the compression layer 4 upon application of a printing pressure can be suppressed by the first base fabric layer 3, so that the positional shift of the surface rubber layer 1 can be suppressed. Consequently, a change in paper feeding ratio which occurs when the printing speed is increased can be decreased while ensuring necessary durability. Also, the registration properties can be improved.

In the printing rubber blanket according to the present invention, the number of base fabric layers can be four, as shown in FIGS. 1 and 6. However, the number of base fabric layers is not limited to four, but can be two (only the first and second base fabric layers) or three (the first to third base fabric layers).

An embodiment of the present invention will be is described in detail with reference to the drawings.

First, rubber blankets A and B were fabricated with the method described as follows.

<Fabrication of Rubber Blanket A>

Sulfur, a vulcanization accelerator M (2-mercaptobenzothiazole), aging inhibitor, strengthening agent, and plasticizer were mixed in 100 parts by weight of medium or high nitrile rubber (NBR). The obtained mixture was dissolved in methyl ethyl ketone to form rubber cement I.

Ten parts by weight of microcapsules (Trade name: Exbancell 092DE with an average particle size of 80 μm, manufactured by Novel Industries Inc.) made of a copolymer of methacrylonitrile and acrylonitrile was added to the rubber cement I described above, thus obtaining rubber cement II.

A 0.27-mm thick cotton woven fabric having a warp thread count of 72 threads/inch with 30-strand threads and a weft-thread count of 108-threads/inch with 30-strand threads was subjected to heat (150° C.) stretch forming in the longitudinal direction which is the rotational direction (printing direction)

of the rubber blanket cylinder. A first base fabric layer having a residual elongation of 35% in the longitudinal direction which is the rotational direction (printing direction) of the blanket cylinder and a breaking strength of 10 kgf/cm in the longitudinal direction was obtained. The measuring method for the residual elongation, and breaking strength will be described as follows.

The breaking strength and residual elongation were measured by a method to be described.

Measuring Machine: Tensilon (Orientec CRTC-1250A)

Measuring Conditions: Sample had a width of 20 mm and a length of 200 mm (between chucks).

Measuring Method: Pulling speed was 50 mm/min.

As second to fourth base fabric layers, cotton woven fabrics each having a thickness of 0.35 mm, a breaking strength of 30 kgf/cm in the longitudinal direction, and a residual elongation of 6% in the longitudinal direction were prepared.

One surface of the second base fabric layer was coated with rubber cement II to a thickness of 0.3 mm. The first base fabric layer was adhered to the coated rubber cement II (unvulcanized compression layer).

The other surface of the second base fabric layer was coated with rubber cement I to a thickness of 0.1 mm to form an unvulcanized adhesive layer. The third base fabric layer was adhered to the adhesive layer. The surface of the third base fabric layer was coated with the rubber cement I to a thickness of 0.1 mm to form an unvulcanized adhesive layer. The fourth base fabric layer was adhered to the adhesive layer.

Finally, the surface of the first base fabric layer was coated with the rubber cement I to a thickness of 0.05 mm to form an unvulcanized adhesive layer. A nitrile rubber compound sheet was formed as an unvulcanized surface rubber layer on the adhesive layer. An unvulcanized compressive rubber blanket (blanket precursor) having a thickness of about 2.2 mm was obtained.

<Vulcanizing Process>

The unvulcanized compressive rubber blanket was heated at 150° C. for 6 hours, and vulcanization was completed.

Successively, the vulcanized compressive rubber blanket was cooled. The surface rubber layer was polished with 320-mesh sand paper. The 2.06-mm thick offset printing rubber blanket A having a structure as shown in FIG. 2 described above was obtained.

<Fabrication of Rubber Blanket B>

The rubber blanket B having the same structure as that of the rubber blanket A described above was prepared, except that the thickness, residual elongation, and breaking strength of the first base fabric layer were changed as shown in the following Table 1.

The paper feeding ratios of the obtained rubber blankets A and B were measured while changing the printing pressure. The results are shown in FIG. 3.

Figure 3:
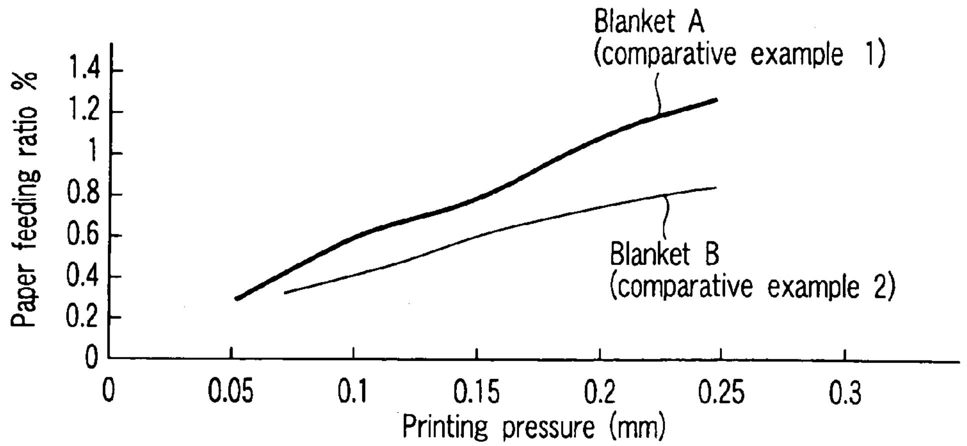
FIG. 3 is a graph showing the relationship between a printing pressure and paper feeding ratio of rubber blankets A and B.

As is apparent from FIG. 3, it can be understood that a change in paper feeding ratio accompanying an increase in printing pressure is smaller in the rubber blanket B having a smaller residual elongation.

In actual multi-color printing, the printing pressure of each printing unit is not always constant. A change in thickness occurs in the rubber blanket of each printing unit is used over time. The change in thickness is not necessarily the same among the respective units, and accordingly a change occurs in printing pressure among the units. The change in printing pressure among the printing units causes a difference in paper feeding ratio (increasing circumference ratio of the rubber blanket) among the units. Consequently, with the rubber blanket B described above, problems such as travel instability of the printing sheet and defective registration occur.

<Fabrication of Rubber Blanket C>

A rubber blanket C having the same structure as that of the rubber blanket A described above was prepared, except that the thickness, residual elongation, and breaking strength of the first base fabric layer were changed as shown in the following Table 1.

The paper feeding ratios of the obtained rubber blankets B and C were measured while changing the printing pressure. The results are shown in FIG. 4.

Figure 4:
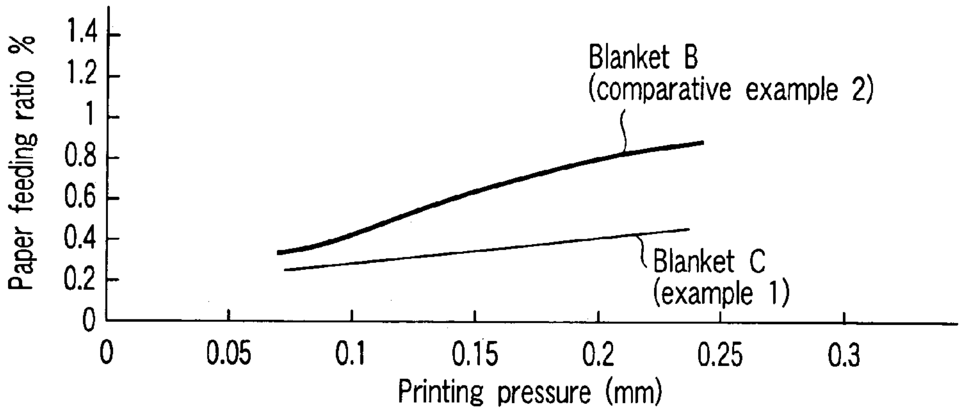
FIG. 4 is a graph showing the relationship between a printing pressure and paper feeding ratio of the rubber blanket B and a rubber blanket C.

As is apparent from FIG. 4, it can be understood that, with the blanket C (Example 1) which uses the first base fabric layer having a breaking strength within the range of 20 to 70 kgf/cm and a residual elongation of 7% (inclusive) to 15% (exclusive), when compared to the blanket B (Comparative Example 2) which uses the first base fabric layer having the breaking strength within the range of 20 to 70 kgf/cm but the residual elongation exceeding 15%, a change in paper feeding ratio accompanying an increase in printing pressure is much smaller.

According to the finding of the present inventors, when the printing speed varies, the paper feeding ratio of the rubber blanket (the increasing circumference ratio of the rubber blanket) also varies. In actual printing, the printing speed changes at the start and end of the printing process. When the printing, speed changes continuously, if the paper feeding ratio of the rubber blanket (the increasing circumference ratio of the rubber blanket) varies, the travel of the sheet becomes unstable, and the amount of waste paper increases. It was also clear that, when the printing speed changed continuously, the residual elongation of the first base fabric layer influenced the paper feeding ratio (the increasing circumference ratio of the rubber blanket).

<Fabrication of Rubber Blankets E and D>

Rubber blankets E and D having the same structures as that of the rubber blanket A described above were prepared, except that the thicknesses, residual elongations, and breaking strengths of the first base fabric layers were changed as shown in the following Table 1.

The paper feeding ratios of the obtained rubber blankets E and D were measured while changing the rotational speed of the rubber blanket cylinder. The results are shown in FIG. 5.

Figure 5:
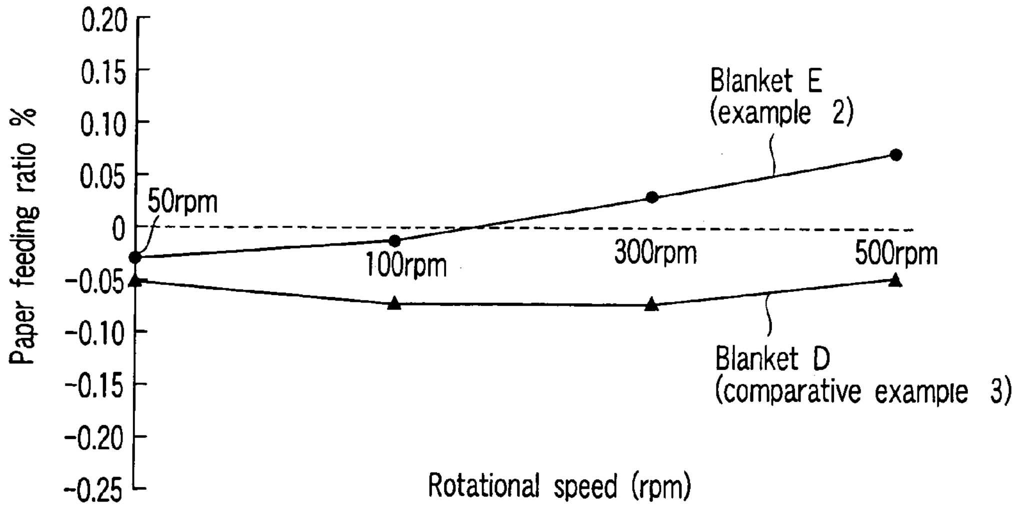
FIG. 5 is a graph showing the relationship between the rotational speed of a cylinder and a paper feeding ratio of rubber blankets E and D.

As is apparent from FIG. 5, with the blanket E (Example 2) which uses the first base fabric layer having a breaking strength within the range of 20 to 70 kgf/cm and a residual elongation of 7% (inclusive) to 15% (exclusive), as the rotational speed of the cylinder increases, the paper feeding ratio increases at a substantially constant rate.

In contrast to this, with the blanket D (Comparative Example 3) which uses the first basic layer having the residual elongation exceeding 15%, no regularity is found between a change in rotational speed of the cylinder and a change in paper feeding ratio.

<Fabrication of Rubber Blankets F, G, H, and I>

Rubber blankets F to I having the same structures as that of the rubber blanket A described above were prepared, except that the thicknesses, residual elongations, and breaking strengths of the first base fabric layers were changed as shown in the following Table 1.

<Fabrication of Rubber Blankets J, K, and L>

Rubber blankets J, K, and L were prepared by following the same procedure as that described with reference to the rubber blanket A, except that as each first base fabric layer, a woven fabric having a residual elongation, breaking strength, and thickness as shown in the following Table 1 and made of mixed fiber of cotton fiber and polyvinyl alcohol fiber (PVA fiber) was used.

EXAMPLE 7

<Fabrication of Rubber Blanket M>

A first base fabric layer having a thickness, type of constituent fiber, residual elongation, and breaking strength as shown in the following Table 1, and second to fourth base fabric layers of the same type as that described regarding the rubber blanket A described above were used. The first to fourth base fabric layers were adhered in the same manner as that described regarding the rubber blanket A described above.

Four parts by weight of microcapsules of the same type as that described regarding the rubber blanket A described above were added to the rubber cement I described above. Thus, rubber cement III was obtained.

Subsequently, the surface of the first base fabric layer was coated with the rubber cement I to a thickness of 0.05 mm to form an unvulcanized adhesive layer. The adhesive layer was coated with the rubber cement III to a thickness of 0.25 mm. A nitrile rubber compound sheet was formed as an unvulcanized surface rubber layer on the coated rubber III. An unvulcanized compressive rubber blanket (blanket precursor) having a thickness of about 2.2 mm was obtained.

The unvulcanized compressive rubber blanket was subjected to vulcanization, cooling, and polishing in the same manner as that described regarding the rubber blanket A described above. A rubber blanket M for offset printing was obtained.

COMPARATIVE EXAMPLE 7

<Fabrication of Rubber Blanket N>

First to fourth base fabric layers of the same type as that described regarding the rubber blanket A described above were adhered in the same manner as that described regarding the rubber blanket A described above.

Subsequently, the surface of the first base fabric layer was coated with the rubber cement I to a thickness of 0.05 mm to form an unvulcanized adhesive layer. The adhesive layer was coated with the rubber cement III to a thickness of 0.25 mm. A nitrile rubber compound sheet was formed as an unvulcanized surface rubber layer on the coated rubber III. An unvulcanized compressive rubber blanket (blanket precursor) having a thickness of about 2.2 mm was obtained.

The unvulcanized compressive rubber blanket was subjected to vulcanization, cooling, and polishing in the same manner as that described regarding the rubber blanket A described above. A rubber blanket N for offset printing was obtained.

The characteristics of the rubber blankets A to N were evaluated in accordance with a method described below. The results are shown in the following Table 1.

<Change in Paper feeding ratio Upon Speed Change >

The speed was changed from 0 to 500 rpm stepwise for each rubber blanket. The paper feeding ratio upon application of a printing pressure of 0.2 mm was measured for each rotational speed, and its change was observed. Those in which the change amount of the paper feeding ratio (a difference between the maximum and minimum paper feeding ratios) was of less than 0.2% upon a speed change are indicated by ◎, those in which the change amount was 0.2% (inclusive) to 0.3% (exclusive) are indicated by ○, and those in which the change amount was 0.3% or more are indicated by X.

<Presence/Absence of Cloth Mark During Printing>

Whether or not a cloth mark appeared in the printed product test with a printing test using an RI tester (portable printing tester: Akira Seisakusho) was determined for each rubber blanket. Those which produced no cloth marks are indicated by ○, and those which produced cloth marks are expressed as X.

<Durability of First Base Fabric Layer>

The durability was tested with a blanket durability tester. Those which caused no problems with the blanket durability tester until 5,000,000 revolutions are indicated by ○, and those which caused a problem in durability before 5,000,000 revolutions are indicated by X.

<Registration Properties>

Registration properties refer to the overlaying alignment accuracy in multi-color printing. Those with which no "blur" or "shift" occurred in the register mark (registration index printed in the margin of the printing product during printing) are indicated by ○, and those which had poor registration properties are indicated by X.

<Overall Evaluation>

In the overall evaluation of Table 1, those in which all of the four items, i.e., a change in paper feeding ratio, presence/absence of a cloth mark, durability, and registration properties are ○ are indicated as ○, of which those which had any ◎ are indicated as ◎. Those which had X for at least one of four items are indicated as X.

TABLE 1

| | Sample No. | Thickness of First Base Fabric Layer (mm) | Type of Fiber Constituting First Base Fabric Layer | Residual Elongation (%) | Breaking Strength (kgf/cm) | Change in Paper Feeding Ratio Upon Speed Change | Presence/Absence of Cloth Mark in Printing | Durability of First Base Fabric Layer | Registration Properties | Overall Evaluation |
|---|---|---|---|---|---|---|---|---|---|---|
| Example 1 | C | 0.27 | Cotton | 12 | 28 | ○ | ○ | ○ | ○ | ○ |
| Example 2 | E | 0.25 | Cotton | 12 | 40 | ○ | ○ | ○ | ○ | ○ |
| Example 3 | H | 0.27 | Cotton | 7 | 25 | ○ | ○ | ○ | ○ | ○ |
| Example 4 | J | 0.22 | Cotton + PVA | 11 | 45 | ◎ | ○ | ○ | ○ | ◎ |
| Example 5 | K | 0.21 | Cotton + PVA | 7 | 30 | ◎ | ○ | ○ | ○ | ◎ |

TABLE 1-continued

| | Sample No. | Thickness of First Base Fabric Layer (mm) | Type of Fiber Constituting First Base Fabric Layer | Residual Elongation (%) | Breaking Strength (kgf/cm) | Change in Paper Feeding Ratio Upon Speed Change | Presence/Absence of Cloth Mark in Printing | Durability of First Base Fabric Layer | Registration Properties | Overall Evaluation |
|---|---|---|---|---|---|---|---|---|---|---|
| Example 6 | L | 0.25 | Cotton + PVA | 7 | 30 | ◎ | ○ | ○ | ○ | ◎ |
| Example 7 | M | 0.27 | Cotton | 7 | 25 | ○ | ○ | ○ | ○ | ○ |
| Comparative Example 1 | A | 0.27 | Cotton | 35 | 10 | X | ○ | X | X | X |
| Comparative Example 2 | B | 0.27 | Cotton | 18 | 20 | ○ | ○ | ○ | X | X |
| Comparative Example 3 | D | 0.25 | Cotton | 18 | 20 | ○ | ○ | ○ | X | X |
| Comparative Example 4 | I | 0.27 | Cotton | 6 | 30 | ○ | ○ | X | ○ | X |
| Comparative Example 5 | F | 0.35 | Cotton | 7 | 35 | ○ | X | ○ | ○ | X |
| Comparative Example 6 | G | 0.15 | Cotton | 15 | 14 | X | ○ | X | ○ | X |
| Comparative Example 7 | N | 0.27 | Cotton | 35 | 10 | X | ○ | X | X | X |

As is apparent from Table 1, it can be understood that the rubber blankets (blankets C, E, H, J, K, L, and M) of Examples 1 to 7, each including the first base fabric layer having a thickness within the range of 0.17 to 0.33 mm, a residual elongation within the range 7% (inclusive) to 15% (exclusive) in the printing direction, and a breaking strength within the range of 20 to 70 kgf/cm in the printing direction, are excellent in all of a change in paper feeding ratio upon a speed change, the presence/absence of a cloth mark during printing, the durability of the first base fabric layer, and the registration properties of the rubber blanket. Above all, each of the rubber blankets of Examples 4 to 6 which had a thickness of 0.17 to 0.25 mm, a residual elongation of 7% to 11%, and a breaking strength of 30 to 70 kgf/cm was excellent as its change in paper feeding ratio upon a speed change was less than 0.2%. The smaller the change amount of the paper feeding ratio upon a speed change, the better the printing product that does not depend on the printing speed that can be obtained.

In contrast to this, the rubber blanket (blanket A) of Comparative Example 1, which had a residual elongation of 15% or more and a breaking strength of less than 20 kgf/cm, was inferior in the change in paper feeding ratio upon a speed change, durability, and registration properties. If the change amount of the paper feeding ratio is 0.3% or more, the resulting printed product has a problem. The rubber blankets (blankets B and D) of Comparative Examples 2 and 3, each of which had a residual elongation of larger than 15%, were inferior in registration properties. The rubber blanket (blanket I) of Comparative Example 4 which had a residual elongation of less than 7% was inferior in durability. With the rubber blanket (blanket F) of Comparative Example 5 which had a thickness exceeding 0.33 mm, a cloth mark appeared on the printed product. When the rubber blanket (blanket G) of Comparative Example 6 had a thickness of less than 0.17 mm and a breaking strength of less than 20 kgf/cm, the change in paper feeding ratio upon a speed change was small, and the durability was low.

In Comparative Example 7 (rubber blanket N), although the first base fabric layer was arranged between the surface rubber layer and second base fabric layer, the first base fabric layer had a residual elongation of 15% or more and a breaking strength of smaller than 20 kgf/cm. Thus, this rubber blanket was inferior in change in paper feeding ratio, durability, and registration properties.

As has been described above in detail, according to the present invention, a printing rubber blanket which has a small paper feeding ratio during printing and excellent durability can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A printing rubber blanket comprising:

a surface rubber layer;

a first base fabric layer to be adhered to a lower surface of the surface rubber layer;

a compression layer to be adhered to the first base fabric layer; and a second base fabric layer to be adhered to the compression layer, wherein the first base fabric layer contains at least one type of fiber selected from the group consisting of nylon-based fiber, polyester-based fiber, polyvinyl-alcohol-based fiber, polyolefin-based-fiber, rayon fiber, and cotton fiber, and has a thickness within a range of 0.17 to 0.33 mm, a residual elongation within a range of 7% (inclusive) to 15% (exclusive) in a printing direction which is a longitudinal direction of the first base fabric layer, and a breaking strength within a range of 20 to 70 kgf/cm in the printing direction.

2. A printing rubber blanket according to claim 1, wherein the first base fabric layer has a thickness within a range of 0.17 to 0.25 mm, a residual elongation within a range of 7 to 11%, and a breaking strength within a range of 30 to 70 kgf/cm.

3. A printing rubber blanket according to claim 2, wherein the first base fabric layer contains at least one type of fiber selected from the group consisting of fiber, nylon fiber, polyvinyl-alcohol-based fiber, and polyester fiber.

4. A printing rubber blanket according to claim 1, wherein the second base fabric layer has a thickness within a range of 0.2 to 0.5 mm, a residual elongation within a range of 3 to 7.5% in the printing direction, and a breaking strength within a range of 20 to 70 kgf/cm in the printing direction, and contains at least one type of fiber selected from the group consisting of cotton fiber and polyvinyl-alcohol-based fiber.

5. A printed rubber blanket according to claim 1, wherein the surface rubber layer has a thickness within a range of 0.15 to 0.45 mm.

6. A printed rubber blanket according to claim 1, further comprising a third base fabric layer to be adhered to the second base fabric layer, and a fourth base fabric layer to be adhered to the third base fabric layer.

7. A printing rubber blanket according to claim 1, wherein the first base fabric layer is subjected to heat stretch forming in the printing direction.

8. A printing rubber blanket comprising:

a surface rubber layer;

a second base fabric layer; and a first base fabric layer to be provided between the surface rubber layer and second base fabric layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction which is a longitudinal direction of the first base fabric layer, and a breaking strength within a range of 20 to 70 kgf/cm in the printing direction.

9. A printing rubber blanket according to claim 8, wherein a residual elongation of the second base fabric layer in the printing direction is smaller than that of the first base fabric layer.

10. A printing rubber blanket according to claim 8, wherein the second base fabric layer has a thickness within the range of 0.2 to 0.5 mm, a residual elongation within a range of 3 to 7.5% in the printing direction, and a breaking strength within the range of 20 to 70 kgf/cm in the printing direction, and contains at least one type of fiber selected from the group consisting of cotton fiber and polyvinyl-alcohol-based fiber.

11. A printing rubber blanket comprising:

a surface rubber layer;

a first base fabric layer to be adhered to a lower surface of the surface rubber layer;

a compression layer to be adhered to the first base fabric layer; and a second base fabric layer to be adhered to the compression layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17. to 0.33 mm, a residual elongation within a range of 7% (inclusive) to 15% (exclusive) in a printing direction which is a longitudinal direction of the first base fabric layer, and a breaking strength within a range of 20 to 70 kgf/cm in the printing direction, and wherein a residual elongation of the second base fabric layer in the printing direction is smaller than that of the first base fabric layer.

12. A printing rubber blanket comprising a surface rubber layer;

a first base fabric layer to be adhered to a lower surface of the surface rubber layer;

a compression layer to be adhered to the first base fabric layer; and a second base fabric layer to be adhered to the compression layer;

wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction which is a longitudinal direction of the first base fabric layer, and a breaking strength within a range of 20 to 70 kgf/cm in the printing direction, and wherein the second base fabric layer has a thickness within a range of 0.2 to 0.5 mm, a residual elongation within a range of 3 to 7.5% in the printing direction, and a breaking strength within a range of 20 to 70 kgf/cm in the printing direction, and contains at least one type of fiber selected from the group consisting of cotton fiber and polyvinyl-alcohol-based fiber, the residual elongation of the second base fabric layer is smaller than that of the first base fabric layer.

13. A printing rubber layer blanket comprising:

a surface rubber layer;

a second base fabric layer; and a first base fabric layer to be provided between the surface rubber layer and second base fabric layer, wherein the first base fabric layer contains at least one type of fiber selected from the group consisting of nylon-based fiber, polyester-based fiber, polyvinyl-alcohol-based fiber, polyolefin-based fiber, rayon fiber, and cotton fiber, and has a thickness within a range of 0.17 to 0.33 mm, a residual elongation within a range of 7% (inclusive) to 15% (exclusive) in a printing direction which is a longitudinal direction of the first base fabric layer, and a breaking strength within a range of 20 to 70 kgf/cm in the printing direction, and wherein the second base fabric layer has a thickness within a range of 0.2 to 0.5 mm, a residual elongation within a range of 3 to 7.5% in the printing direction, and a breaking strength within a range of 20 to 70 kgf/cm in the printing direction, and contains at least one type of fiber selected from the group consisting of cotton fiber and polyvinyl-alcohol-based fiber, the residual elongation of the second base fabric layer is smaller than that of the first base fabric layer.

* * * * *